CUSHIONED LATERAL MOTION AXLE ADAPTOR
Filed July 8, 1965
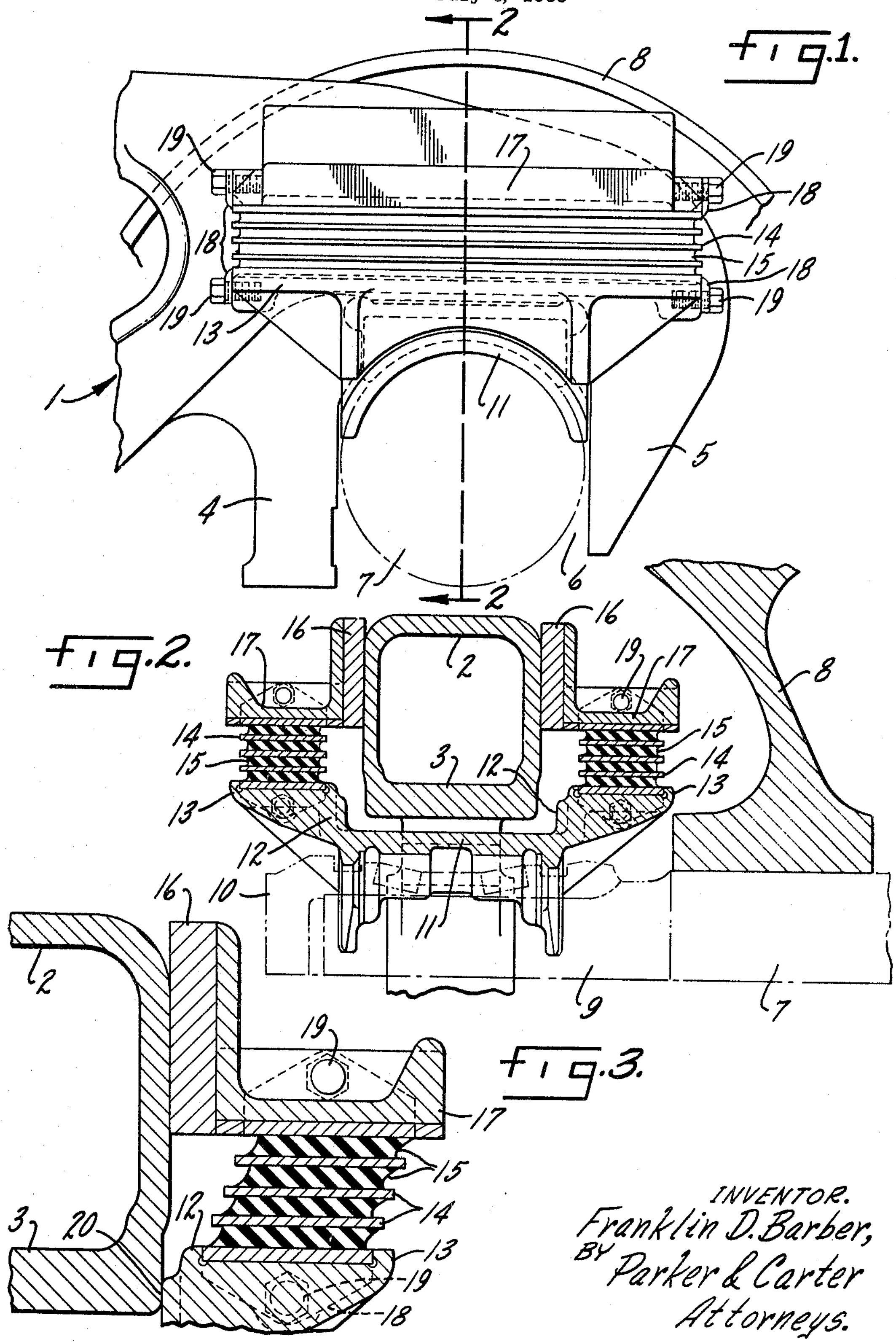

United States Patent Office 3,380,400 Patented Apr. 30, 1968

3,380,400

CUSHIONED LATERAL MOTION AXLE ADAPTOR

Franklin D. Barber, Chicago, Ill., assignor to Standard Car Truck Company, Chicago, Ill., a corporation of Illinois Filed July 8, 1965, Ser. No. 470,378
4 Claims. (Cl. 105—218)

ABSTRACT OF THE DISCLOSURE

The invention involves the use of an adaptor which rides on the anti-friction bearing of a railroad car axle. It fits in the window in the car frame to hold the adaptor against substantial horizontal movement perpendicular to the axle while the adaptor itself is free to move vertically with respect to the car frame, being cushioned by laterally projecting shelves on the adaptor and the frame between which are held cushions made up of parallel rigid plates with interposed sheets of elastomeric material between them to permit both horizontal and vertical displacement of the shelves together with interlocking members on frame and adaptor to limit longitudinal movement of the adaptor with respect to the frame.

This invention relates to improvements in railroad car trucks and has for one object to provide a new, simple, durable and effective lateral motion device which may be interposed between the car truck and a car axle having an anti-friction bearing.

Another object is to provide a cushion means which permits a limited range of transverse movement of the anti-friction bearing of a car axle supporting a car truck, with respect to the truck itself.

Another object is to provide a cushioning means which provides a limited damped vertical movement between the car truck and the axle and a limited damped horizontal relative movement parallel to the axle between the car truck and the axle.

While a railroad car truck includes two side frames and is supported on at least two car axles, in the interest of simplicity, only a part of the side frame, car axle and wheel are illustrated.

Other objects will appear from time to time throughout the specification and claims.

The invention is illustrated more or less diagrammatically in the accompanying drawings, wherein:

FIGURE 1 shows a side elevation of the end of a railroad car truck side frame with associated parts;

FIGURE 2 shows a vertical section along the line 2—2 of FIGURE 1;

FIGURE 3 is a section similar to FIGURE 2 showing parts in different relative position.

Like parts are indicated by like numerals throughout the specification and drawings.

A railroad car truck side frame 1 is generally tubular having an upper chord 2 and a lower chord 3. Depending downwardly from the lower chord are pedestals 4 and 5 which define a jaw 6. The car axle 7 carries a railroad car wheel 8 and terminates at its outer end in a journal 9 enclosed by a bearing housing 10 which contains an anti-friction bearing to carry the journal 9. An adaptor 11 rests on the upper portion of the bearing housing, interlocks therewith and extends through the jaw 6 projecting on both sides of the frame therefrom. The adapter and the bearing housing are both of such width in a plane perpendicular to the axle that they fit smoothy within the jaw and are held by the pedestals against substantial horizontal movement perpendicular to the axle but are free to move vertically and laterally in the jaw as a unit.

Lugs 12 extend upwardly from the outboard ends of the adaptor above the bottom of the chord 3 and carry outwardly projecting horizontal cushion platforms or shelves 13 spaced from and extending in general parallelism with the side frames and projecting at each end beyond the jaw 6.

Each cushion platform supports an elastomeric cushion which comprises a plurality of rigid, preferably horizontal metallic plates 14 with relatively thin sheets of elastomeric material 15. Each cushion thus is a metal and elastomeric sandwich extending upwardly from the platforms 13 to a point intermediate the upper and lower chords of the side frames. Plates 16 are permanently attached to opposite sides of the side frame, extending downwardly from adjacent the top of the upper chord. Cushion shelves or platforms 17 extend laterally from the plates 16 in parallelism with and in general register with the cushion platforms 13 and rest upon the elastomeric cushion sandwiches to support the weight of the car transmitted through the side frame, the platforms, flanges, cushions and adaptor to the axle so that the upper portion of the adaptor within the jaw 6 is held out of contact with the under chord of the side frame.

The cushions are held in place between the platforms 13 and 17 by clips 18 held by cap screws 19.

The elastomeric sheets 15 may yield, being thin and held between broadly extended surfaces slightly to cushion downward movement of the side frame toward the axle but they yield much more freely in sheer as indicated in FIGURE 3 to permit lateral displacement of the axle and its bearing with respect to the side frame. Such lateral displacement is limited by contact between the lower portion of the side frame and the lugs as indicated at 20 in FIGURE 3.

This limited lateral movement of the axle perpendicular to the side frame is necessary because the anti-friction bearing, the bearing housing and the adaptor cannot well be allowed to have any movement longitudinally of the axle. In this respect it is unlike the usual journal brass where such longitudinal movement of the axle is permissible. It is important, however, that such lateral movement be cushioned, be not free and the elastomeric sandwiches provide adequate cushioning and at the same time furnish a yielding resistance to lateral movement.

I claim:

1. In combination, a railroad car side frame, pedestals depending from the lower chord to define a jaw, an adaptor vertically movable within the jaw, a car wheel axle, an anti-friction bearing therefor and a housing, enclosing the bearing and interlocking with the adaptor, the axle, the bearing, the housing and the adaptor being longitudinally movable within the jaw as a unit in a direction parallel to the axle, positive means for limiting the longitudinal and vertical movement of the adaptor in the jaw, cushion means interposed between the adaptor and the side frame for yieldingly resisting relative movement of the adaptor and the frame,
   the adaptor including cushion shelves outside of the jaw extending along opposite sides of the side frame, cushion shelves fixed on the side frame overlying the shelves on the adaptor, the cushion means including an elastomeric body interposed between the shelves and co-extensive therewith.

2. In combination, a railroad car side frame, pedestals depending from the lower chord to define a jaw, an adaptor vertically movable within the jaw, a car wheel axle, an anti-friction bearing therefor and a housing, enclosing the bearing and interlocking with the adaptor, the axle, the bearing, the housing and the adaptor being longitudinally movable within the jaw as a unit in a direction parallel to the axle, cushion shelves extending laterally from both sides of the adaptor generally parallel with the side frames, cushion shelves rigidly mounted on the side frames above and generally registering with the cushion shelves on the adaptor, elastomeric cushions between said shelves including a plurality of parallel rigid plates and elastomeric layers between them.

3. In combination, a railroad car side frame, pedestals depending from the lower chord to define a jaw, an adaptor vertically movable within the jaw, a car wheel axle, an anti-friction bearing therefor and a housing, enclosing the bearing and interlocking with the adaptor, the axle, the bearing, the housing and the adaptor being longitudinally movable within the jaw as a unit in a direction parallel to the axle, cushion shelves extending laterally from both sides of the adaptor generally parallel with the side frames, cushion shelves rigidly mounted on the side frames above and generally registering with the cushion shelves on the adaptor, elastomeric cushions between said shelves including a plurality of parallel rigid plates and elastomeric layers between them, the cushions being adapted to yieldingly hold the adaptor out of contact with the side frame and to yieldingly resist movement of the adaptor transverse to the side frame.

4. In combination, a railroad car side frame, pedestals depending from the lower chord to define a jaw, an adaptor vertically movable within the jaw, a car wheel axle, an anti-friction bearing therefor and a housing, enclosing the bearing and interlocking with the adaptor, the axle, the bearing, the housing and the adaptor being longitudinally movable within the jaw as a unit in a direction parallel to the axle, cushion shelves extending laterally from both sides of the adaptor generally parallel with the side frames, cushion shelves rigidly mounted on the side frames above and generally registering with the cushion shelves on the adaptor, elastomeric cushions between said shelves including a plurality of parallel rigid plates and elastomeric, layers between them, the cushions being adapted to yieldingly hold the adaptor out of contact with the side frame and to yieldingly resist movement of the adaptor transverse to the side frame, the cushion plates on the adaptor extending upwardly above the lower chord of the side frame and spaced horizontally therefrom to positively limit transverse displacement of the adaptor in the side frame.

References Cited

UNITED STATES PATENTS

| | | | |
|---|---|---|---|
| 977,139 | 11/1910 | Sharpneck | 105—222 |
| 2,033,864 | 3/1936 | Piron | 105—224.1 |
| 2,085,689 | 6/1937 | Wallace et al. | 105—223 |
| 3,099,967 | 8/1963 | Hirst et al. | 105—224.1 |

FOREIGN PATENTS

| | | |
|---|---|---|
| 753,995 | 8/1956 | Great Britain. |

ARTHUR L. LA POINT, *Primary Examiner.*

EUGENE G. BOTZ, *Examiner.*

H. BELTRAN, *Assistant Examiner.*